United States Patent
Dritschler et al.

(10) Patent No.: US 7,734,676 B2
(45) Date of Patent: Jun. 8, 2010

(54) METHOD FOR CONTROLLING THE NUMBER OF SERVERS IN A HIERARCHICAL RESOURCE ENVIRONMENT

(75) Inventors: Greg M. Dritschler, Poughkeepsie, NY (US); Guenter Vater, Rottenburg (DE); Robert Vaupel, Rottenburg (DE); Peter B. Yocom, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 853 days.

(21) Appl. No.: 10/180,868

(22) Filed: Jun. 26, 2002

(65) Prior Publication Data
US 2003/0005028 A1    Jan. 2, 2003

(30) Foreign Application Priority Data
Jun. 27, 2001   (EP)   ................................. 01115447

(51) Int. Cl.
*G06F 15/16* (2006.01)
(52) U.S. Cl. .................. 709/200; 709/201; 709/204
(58) Field of Classification Search ................ 709/104, 709/105, 225, 223, 224, 102, 103, 200, 204, 709/201; 370/465, 230, 235, 401, 228, 231, 370/232, 234, 450, 468, 252; 707/10; 717/149
See application file for complete search history.

(56) References Cited

U.S. PATENT DOCUMENTS

| | | | |
|---|---|---|---|
| 5,459,864 A * | 10/1995 | Brent et al. ................. | 718/105 |
| 5,473,773 A | 12/1995 | Aman et al. ................. | 395/650 |
| 5,504,894 A | 4/1996 | Ferguson et al. ............ | 395/650 |
| 5,537,542 A | 7/1996 | Eilert et al. ............ | 395/184.01 |
| 5,675,739 A | 10/1997 | Eilert et al. ............ | 395/200.11 |
| 5,852,818 A * | 12/1998 | Guay et al. ..................... | 707/1 |
| 5,974,462 A * | 10/1999 | Aman et al. ................. | 709/225 |
| 5,991,792 A * | 11/1999 | Nageswaran ................ | 718/102 |
| 6,259,705 B1 * | 7/2001 | Takahashi et al. ........... | 370/465 |
| 6,912,534 B2 * | 6/2005 | DeBettencourt et al. ...... | 707/10 |
| 7,299,269 B2 * | 11/2007 | Elving ........................ | 709/218 |
| 2002/0052909 A1 * | 5/2002 | Seeds ......................... | 709/104 |
| 2002/0194211 A1 * | 12/2002 | Subramanian et al. ...... | 707/500 |

* cited by examiner

*Primary Examiner*—Karen C Tang
(74) *Attorney, Agent, or Firm*—William A. Kinnaman, Jr.

(57) ABSTRACT

The invention relates to the control of servers which process client work requests in a computer system on the basis of resource consumption. Each server contains multiple server instances (also called "execution units") which execute different client work requests in parallel. A workload manager determines the total number of server containers and server instances in order to achieve the goals of the work requests. The number of server instances started in each server container depends on the resource consumption of the server instances in each container and on the resource constraints, service goals and service goal achievements of the work units to be executed. At predetermined intervals during the execution of the work units the server instances are sampled to check whether they are active or inactive. Dependent on the number of active server instances the number of server address spaces and server instances is repeatedly adjusted to achieve an improved utilization of the available virtual storage and an optimization of the system performance in the execution of the application programs.

11 Claims, 6 Drawing Sheets

METHOD FOR CONTROLLING THE NUMBER OF SERVERS IN A HIERARCHICAL RESOURCE ENVIRONMENT

BACKGROUND OF THE INVENTION

1. Field of the Invention

The invention relates to a method and apparatus to be used in a computer system with an operating system having server regions which are managed by a workload manager to provide resources for processing work units received from application programs. The invention also relates to a program and program product.

2. Description of the Related Art

In computer systems workload management is a concept whereby units of work that are managed by an operating system are organized into classes (referred to as service classes) which have assigned system resources in accordance with predefined goals. Resources are reassigned from a donor class to a receiver class if the improvement in performance of the receiver class resulting from such reassignment exceeds the degradation in performance of the donor class. Thus, reassignment takes place if there is a net positive effect in performance as determined by predefined performance criteria. Workload management of this type differs from resource management performed by most known operating systems. The assignment of resources is determined not only by its effect on the work units to which the resources are reassigned, but also by its effect on the work units from which they are taken.

Server management combines the effect of workload management with systems in which incoming work requests are placed in a queue for assignment to an available server. Since the frequency at which incoming requests arrive may not be readily controlled, the principal means of controlling the system performance of systems which use work request queues is control of the number of servers. Server management starts and stops servers in a system in compliance with the goal achievement of other work units executing in the system. Server management will only start a server if the performance of other work units is not degraded and will remove servers if more work requests of upper service classes demand resources which are allocated to a server in order to achieve their goals.

Workload and server management of this type are, for example, disclosed in the following patents, incorporated herein by reference:

U.S. Pat. No. 5,504,894 to D. F. Ferguson et al., entitled "Workload Manager for Achieving Transaction Class Response Time Goals in a Multiprocessing System";

U.S. Pat. No. 5,473,773 to J. D. Aman et al., entitled "Apparatus and Method for Managing a Data Processing System Workload According to Two or More Distinct Processing Goals";

U.S. Pat. No. 5,537,542 to C. K. Eilert et al., entitled "Apparatus and Method for Managing a Server Workload According to Client Performance Goals in a Client/Server Data Processing System";

U.S. Pat. No. 5,974,462 to C. K. Eilert et al., entitled "Method and Apparatus for Controlling the Number of Servers in a Client/Server System"; and U.S. Pat. No. 5,675,739 to C. K. Eilert et al., entitled "Apparatus and Method for Managing a Distributed Data Processing System Workload According to a Plurality of Distinct Processing Goal Types".

In the known systems the workload management components consider a server as an entity disregarding the fact that the server itself can consist of resources and multiple independent execution units or server instances such as, for example, processes scheduling multiple execution threads. In known computer systems the system programmer creating the operating system for controlling the system or the application programmer creating the server application is responsible for determining the number of parallel execution units or server instances which can execute in a server. The operating system and the workload management component control the effect of the total number of servers with respect to the total system performance and the performance achieved by work units executing in different service classes. They do not manage the effect of balancing execution units per server. For the system programmer it is often difficult to determine a suitable number of execution units per server due to a lack of knowledge of the actual resource constraints to which the server itself is exposed. An application programmer may know about resource constraints of the server but may not be aware of the way the server is utilized at execution time. For example, the developers very often don't know the actual execution environment. The resource consumption may be influenced by the amount of data to be processed. Therefore, adjusting the number of execution units is very often not optimal or requires a lengthy tuning process by skilled IT personnel.

SUMMARY OF THE INVENTION

It is an object of the invention to control the number of server instances in server address spaces on the basis of the resource consumption.

It is also an object of the invention to optimize the utilization of the available virtual storage and to improve the system performance in the execution of the application programs.

It is another object of the invention to allow an optimal management of the number of servers in order to achieve the defined performance goals with a minimized resource consumption of server address spaces in the operating system.

In particular, it is a further object of the invention to evaluate and control the resource usage of the server address spaces at execution time.

The invention relates to a method and apparatus to be used in a computer system with an operating system having server regions which are managed by a workload manager to provide resources for processing work units received from application programs. The invention also relates to a computer program product comprising program code means stored on a non-transitory computer readable medium that runs on a computer system.

The environment of the invention is a computer system controlled by an operating system which comprises a pool of servers to service work requests issued by application programs and inserted in work queues. The servers represent sub-components, herein called server instances, in a server address space which is also called a server container. The number of server instances is managed on the basis of both the service classes of the queued work requests and the service classes of competing work in the computer system wherein a service class is a collection of similar work units for which a performance goal has been defined.

The invention, as defined in the claims, allows managing the server instances of the server address spaces based on their resource consumption. The server instances in a server container are sampled at execution time to determine the resource usage of the server instances which are active during a predetermined sampling interval. The sampled data is evaluated to determine the current resource consumption of the computer system in executing the requested work units. A calculation is performed to determine the number of server instances per server address space. The result is used to manage the number of servers in order to achieve the defined performance goals, to minimize the resource consumption of the server container and to improve the system performance in the execution of application programs.

BRIEF DESCRIPTION OF THE DRAWINGS

An embodiment of the invention is subsequently described with reference to drawings in which.

DESCRIPTION OF A PREFERRED EMBODIMENT

Figure 1:
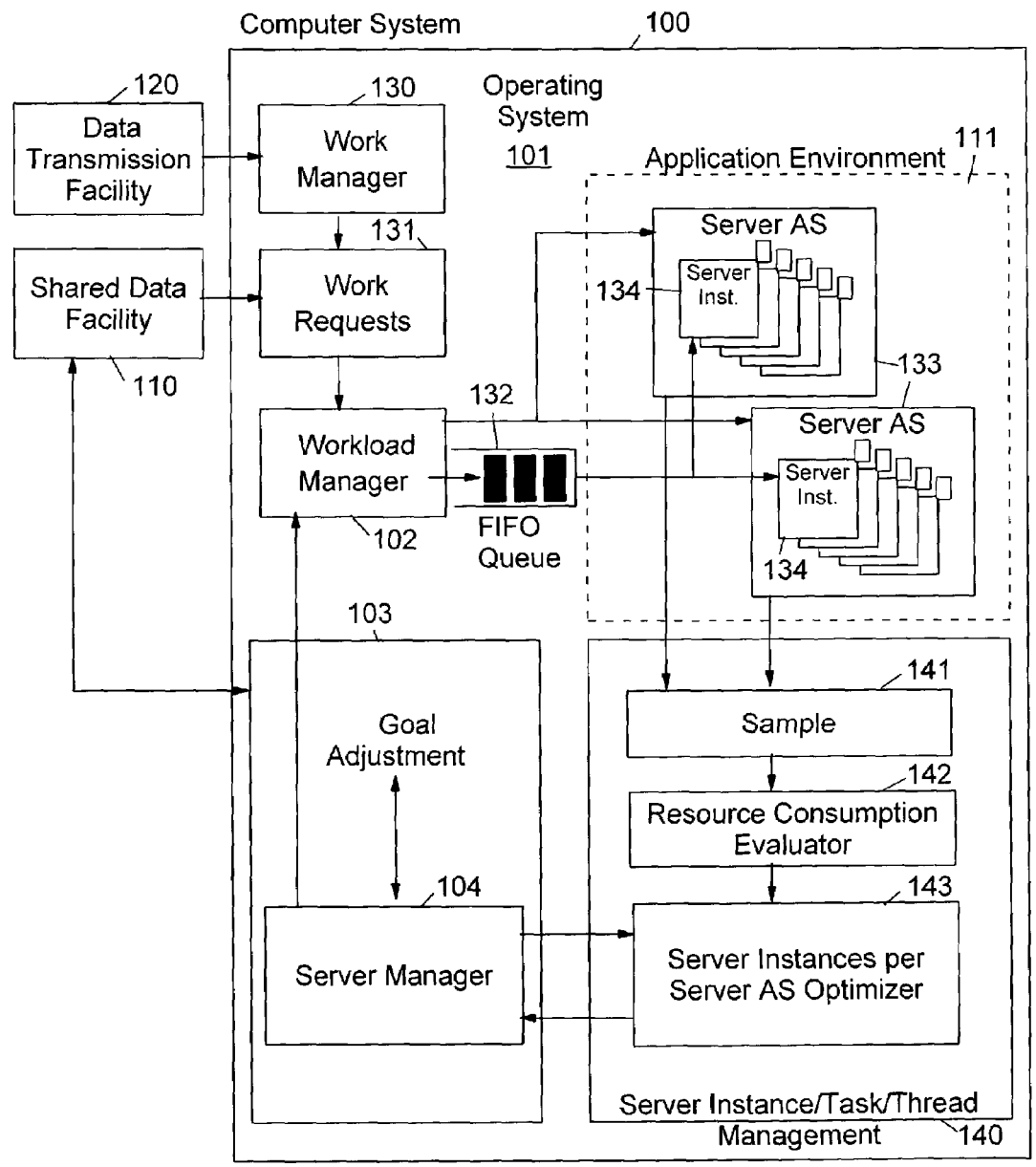
FIG. 1 is a block diagram of an example of the invention embodied in the operating system of a computer system.

FIG. 1 shows a computer system 100 which is controlled by an operating system 101 such as, for example, the IBM z/OS operating system. The operating system 101 executes the steps subsequently described. The computer system 100 further comprises an application environment 111 which represents the components which are assigned to service the execution of an application program. Except for the enhancements provided by the present invention, computer system 100 corresponds to that one disclosed in U.S. Pat. No. 5,675,739, the specification of which is incorporated herein by reference. Although not shown in FIG. 1, the computer system 100 may be one of a plurality of interconnected computer systems that are similarly managed and make up a sysplex. The general server management concept as used by the described embodiment is disclosed in U.S. Pat. No. 5,974,462, the specification of which is incorporated herein by reference.

A workload manager 102, which is a component of the operating system 101, provides operating system services for a work manager 130 to define one or more work queues 132 which represent the workload to be executed. The work manager 130 receives work requests 131 through a data transmission facility 120 from outside the computer system 100. The work manager 130 transfers the work requests 131 to the workload manager 102 on behalf of application programs herein also called clients. A work queue 132 is created for all work requests 131 of the same type. The administrator of the operating system 101 classifies work requests 131 to service classes and determines for this purpose the type of the work requests 131. The service classes correspond to service goals based on performance criteria. The service classes have a hierarchical relationship to one another. Service classes at the upper level contain work requests with strict performance criteria such as short execution time. In addition, the work queues have assigned importance levels which reflect their importance in relation to other work queues. For example, time-critical applications have a higher importance level than archive updating applications.

The workload manager 102 initially starts one or more server instances 134 of a plurality of possible server instances to service work requests 131 which are included in a work queue 132. The workload manager 102 uses server definitions which are stored with its performance goals in a shared data facility 110 to start a server address space 133 which is herein also called a server container. There may be a plurality of server address spaces 133 active at a certain point of time. The address space 133 started by the workload manager 102 contains one or more server instances 134 which may also be called server tasks, server threads or execution units. A server instance 134 obtains a work request 131 from a work queue 132, processes the request 131 and checks the work queue 132 for the next request 131, and repeats these steps until the workload manager 102 tells the server instances to terminate.

The operating system 101 comprises a goal adjustment component 103 which includes a server manager 104 the function of which is to manage the total number of server instances 134 in two different ways. In the first way which is described in U.S. Pat. No. 5,974,462 the server manager 104 uses a fixed number of server instances 134 for each server address space 133 to calculate the total number of server instances 134 which are required and which can be afforded to service the work requests 131. Each server address space 133 can be considered as a container which operates similarly to the computer system 100 in providing resources for executable sub-components. By using a fixed number of server instances 134 per server address space 133, the resource consumption of the application environment 111 may not be optimal. For example, the actual execution environment is not known in advance and the resource consumption may be influenced by the amount of data to be processed. This situation is improved by a second way to manage the total number of servers according to the invention. The second way manages the number of server instances 134 for the server address spaces 133 of a work queue 132 and thus optimizes the resource consumption of the server address spaces 133 and of the operating system 101. For this purpose the operating system 101 comprises a server instance/task/thread manager 140 which controls the resource consumption of the server instances 134 while serving the work requests 131 of the work queue 132. A sampler 141 detects at execution time the resources provided by the server address spaces 133 which are registered in a resource consumption evaluator component 142. The result of the resource consumption evaluation is indicated to a server instance optimizer component 143 which calculates the optimal number of server instances per server address space 143 and provides this result to the server manager 104 of the goal adjustment component 103. The result of this calculation is used by the server manager 104 as a basis for a determination of the total number of servers 134 and the number of server address spaces 133 required. It urges the workload manager 102 either to start additional server address spaces 133, or to initiate the start of additional server instances 134 per server address space 133, or to terminate server instances 134 or server address spaces 133.

Figure 2:
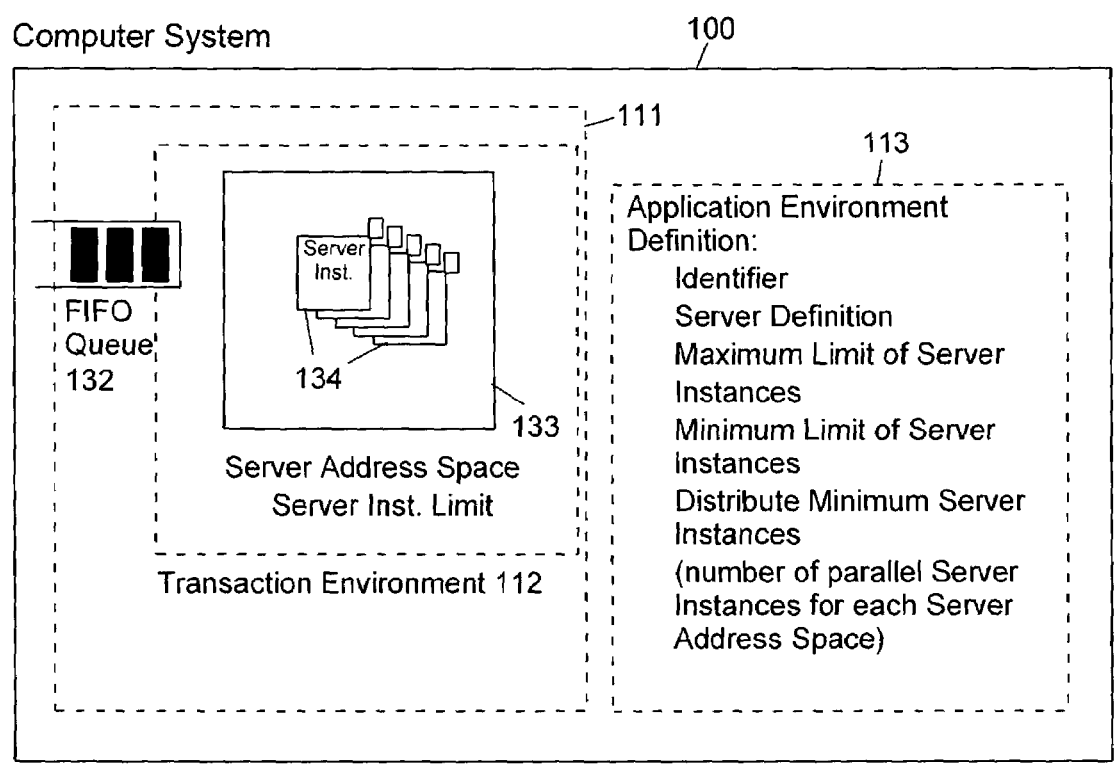
FIG. 2 is a schematic representation of the server region in the system of FIG. 1.

FIG. 2 shows the server environment of the computer system 100 in more detail. All servers of an application are called an application environment 111 comprising an application environment definition 113 which is stored in a shared data facility 110 (FIG. 1). The application environment definition 113 includes an identifier used by the work manager 130

(FIG. 1) to identify the application program which issued the work requests. The application environment definition 111 further includes a server definition which is used by the workload manager 102 to start server address spaces 133 containing the server instances 134 which process the work requests of the application program.

The application environment definition 111 also allows the application program to define a maximum number of server instances 134 to be started by the workload manager to service that application, further a minimum number of server instances 134 being always available and an indication how that minimum should be distributed over multiple work queues created for the application environment 111. A work queue 132 is created as a result of the work classification process initiated by the work manager 130. The classification rules are based on the service goals. They are defined by the administrator of the computer system 100 and stored in the shared data facility 110. The administrator associates the work requests 131 with service classes according to the service goals and the importance values. The work manager 130 classifies all work requests with the assistance of workload manager 102 on the basis of the stored service goals and the importance values. The workload manager 102 inserts the work requests 131 into a work queue 132. A new work queue 132 is created whenever the classification process assigns a new service class for a work request 131. The result is a hierarchy of service classes each assigned to a work queue. In this hierarchy the service class having strict service goals and a high importance value represents an upper level service class while a service class having low service goals and a low importance value is assigned to a lower level service class.

All work queues 132 are served by one or more server address spaces 133, each of which contains one or multiple server instances 134. The combination of a work queue 132 and the server instances 134 serving that work queue 132 is named a transaction environment 112 because all server instances 134 execute work requests of the same service class. The application environment definition 113 can also determine the permitted number of parallel server instances 134 for each server address space 133. In that case the server instances 134 are predefined and the server instance/task/thread manager 140 is not in effect.

Figure 3:
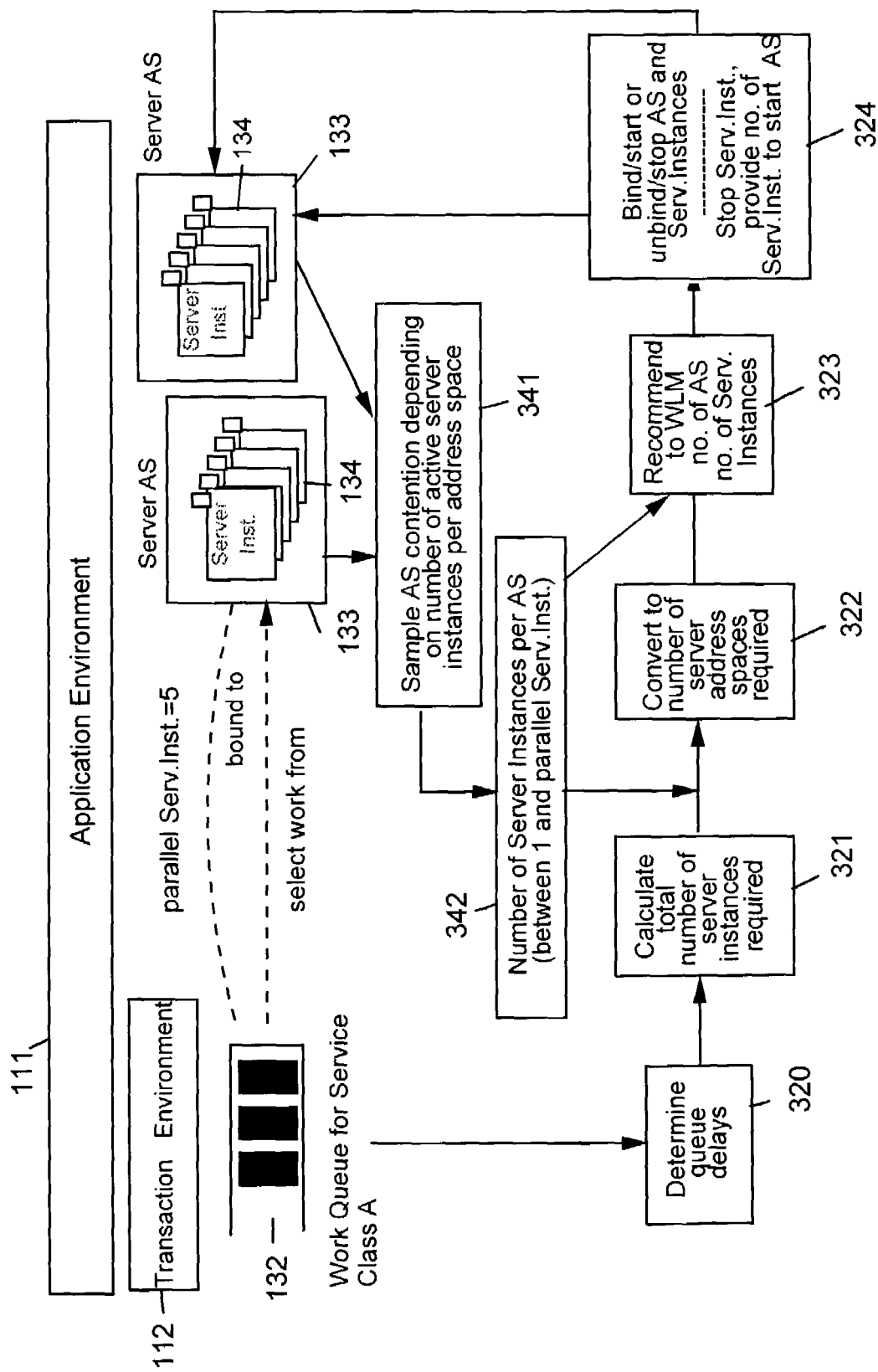
FIG. 3 is a logic flow diagram representing method steps of an embodiment of the invention.

FIG. 3 shows the connection of the work queue 132 and the server instances 134 as well as the operations of the components 102, 103 and 140 of FIG. 1. In step 320 the workload manager 102 determines the current work queue delay in the transaction environment 112 and step 321 takes the work queue delay to calculate the total number of server instances 134 required for that transaction environment 112. Step 322 converts the required number of server instances 134 into the required number of server address spaces 133. In step 323 a recommendation is made to the workload manager 102 on the number of server instances 134 and the number of server address spaces 133. By performing step 324 the workload manager 102 then starts a corresponding number of server address spaces and binds them to the work queue 132 and simultaneously indicates a corresponding number of server instances 134 in each of these address spaces. In the representation shown in FIG. 3 two server address spaces 133 are started and bound to work queue 132 each comprising 5 server instances which are executing in parallel work units selected from the work queue 132.

During the execution of the work units step 341 is performed to learn of the contention on both server address spaces 133 by sampling the server instances 134 of both address spaces to check whether they are active or inactive. Step 341 is performed by components 141 and 142 at predetermined time intervals which are controlled by the operating system 101. In step 342 an updated number of server instances 134 per server address space is determined and provided to steps 322 and 323. By repeating step 322 the number of server address spaces 133 is modified or confirmed on the basis of the number of server instances 134 determined in step 342, and by repeating step 323 a recommendation made to the workload manager 102. Dependent on the number of active server instances this recommendation may confirm the current status or may include a reduction of the number of server address spaces 133 and server instances 134 if fewer server instances 134 are active than were initially started. In the latter case, step 324 is repeated to stop the inactive server instances 134 and, if appropriate, stop and unbind a server address space which is no longer required. As a result, virtual storage is made available for being used by other application environments 111.

Figure 4:
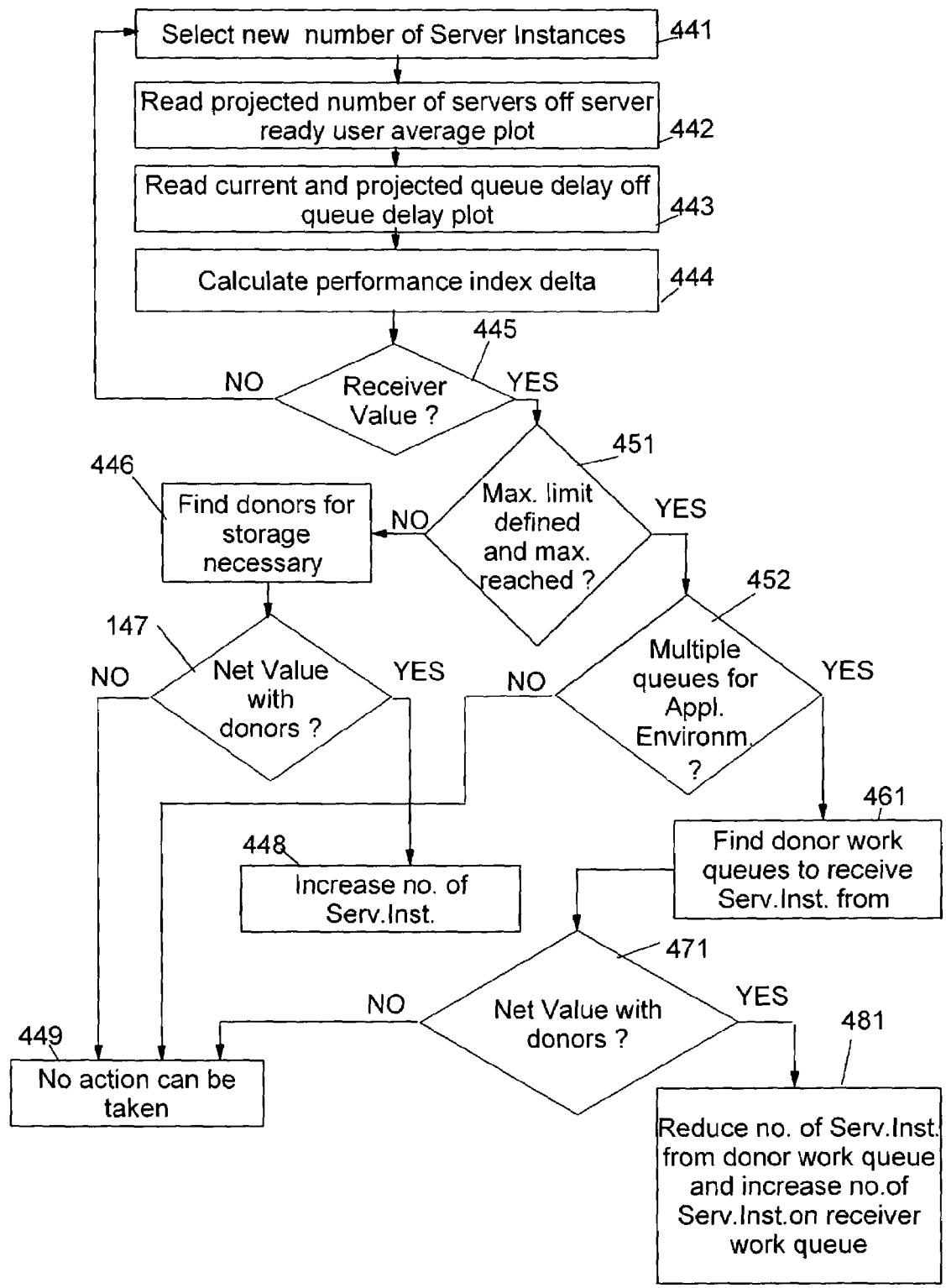
FIG. 4 is a flow diagram representing method steps of the workload management in the operating system of FIG. 1.

Furthermore, the result of steps 341 and 342 may indicate a shortage of service instances. In that case, the steps 322, 323, 324 are repeated to increase the number of server address spaces 133 and therewith to increase also the number of server instances accordingly. The difference between such change of the number of server address spaces 133 and the initial determination of the number of server address spaces 133 is that an optimization of managing the available resources according to their actual need is achieved during execution time. The result of the optimization which is performed repeatedly, for example, every 10 seconds an overall improvement of the system performance in the execution of the application programs. FIG. 4 shows the logic flow to assess possibilities of improving the system performance by starting additional server instances 134. The logic flow shown in FIG. 4 is deployed when a queue delay has been identified as the major bottleneck for the service class to adjust. The mechanism to select performance bottlenecks is described in U.S. Pat. No. 5,974,462 which is herein incorporated by reference. By step 441, a new number of server instances 134 is selected to be assessed. The number should be large enough to result in sufficient receiver value, as checked in step 445, to make the change worthwhile. The number should be not so large that the value of additional server instances 134 is marginal, i.e., an increase of the number of server instances 134 does not significantly increase the total number of queued and running work requests 131. By steps 442, 443 and 444, the effect of the new number of server instances 134 is calculated. A detailed description of these steps is disclosed in U.S. Pat. No. 5,974,462. By step 443 the current and projected queue delays are read from the queue delay graph stored in the workload manager 102. The queue delay graph data is subject to a normalizing operation the result of which is index delta data which is suitable for further processing. In step 444 the index delta between the current and projected queue index is calculated. Step 445 checks the result of step 444 for sufficient receiver value provided by the additional number of server instances 134. If there is sufficient receiver value, step 451 performs a check to determine whether a maximum limit of server instances 134 has been defined and whether the maximum number of server instances 134 for the application environment 111 is reached. If this check is negative, more servers can be started without violating the rules for the application environment 111. The steps 446, 447, 448 and 449 are performed to find donors of server address spaces from a service class of the lowest level for which a performance decrease may be acceptable. If this is not the case, the service class of the next higher level is investigated for the same purpose. If a donor class is found it permits the start of a new server address space 133 for the receiver class. The mechanism to handle donor and receiver classes is described in U.S. Pat. No. 5,974,462.

If a maximum limit for the number of server instances 134 is defined and the maximum number of server address spaces 133 is already started, it is not possible to start additional server address spaces 133. By step 452 a check is made to test whether more than one work queue 132 has been created for the application environment 111. If this is the case, it is possible to look for server address spaces 133 from another work queue 132 of the same application environment 111. Step 461 is used to find a lower level work queue 132 which may be used as donor work queue for at least one additional server address space 133. By step 471, a check is made whether there is a net value to move one or more server address spaces 133 from the donor work queue 132 to the receiver work queue 132. As described in U.S. Pat. No. 5,675,739, this may be determined by using one or more of different criteria. The check includes whether the donor is projected to meet its goals after the resource allocation, or whether there is net gain in the combined performance indexes of donor and receiver. If there is a net value in the change, step 481 reduces the projected number of server address spaces 133 from the donor work queue or queues 132 and increases the number of server address spaces 133 of the receiver work queue or queues 132 accordingly.

Figure 5:
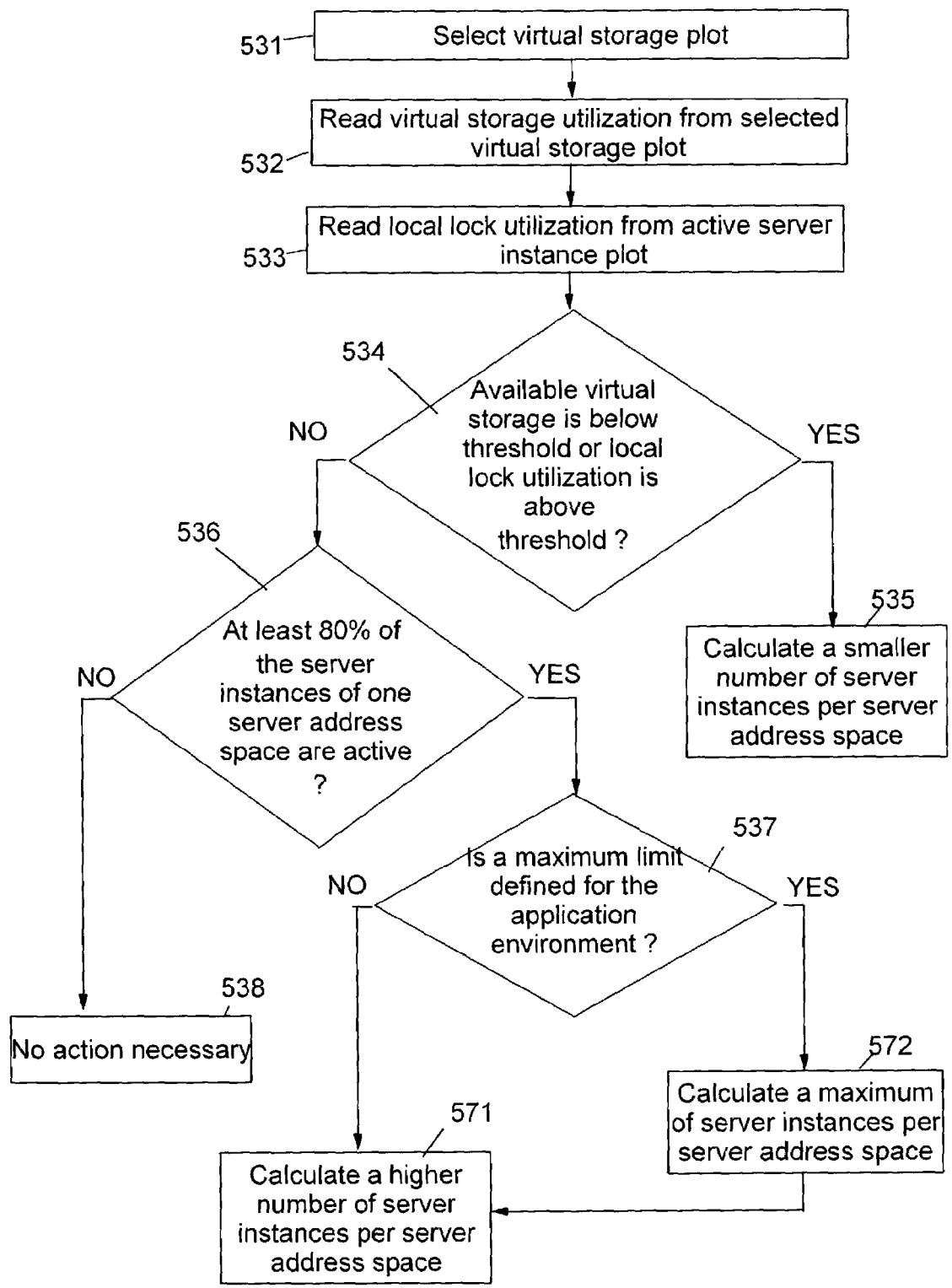
FIG. 5 is a logic flow diagram representing method steps and functions of an improved workload control according to the invention.

FIG. 5 shows the logic flow to calculate the number of server instances 134 per server address space 133. The result of this calculation is a projected count of server instances. Before this count is used in the process described above with reference to FIG. 4, it is applied to the server address spaces 133. For this reason the projected count is provided to the workload manager 102 (FIG. 1) to inform the server address spaces 133 on the adjustment of the number of server instances 134. The workload manager 102 compares the projected count against the number of started server instances 134. If the result makes it necessary to reduce the number of server instances, the workload manager 102 tells excessive server instances 134 of a server address space 133 to be removed. If the result makes it necessary to increase the number of server instances 134, the workload manager 102 informs the server address space 133 to start additional server instances 134. The server address spaces 133 and the server instances 134 apply to the mechanism for reducing and increasing the number of server instances 134. The mechanism described in FIG. 4 uses the started number of server instances 134 per server address space 133. The mechanism in FIG. 5 depends on sampled data about the resource consumption of server instances 134 of the server address spaces 133 at execution time.

Figure 6:
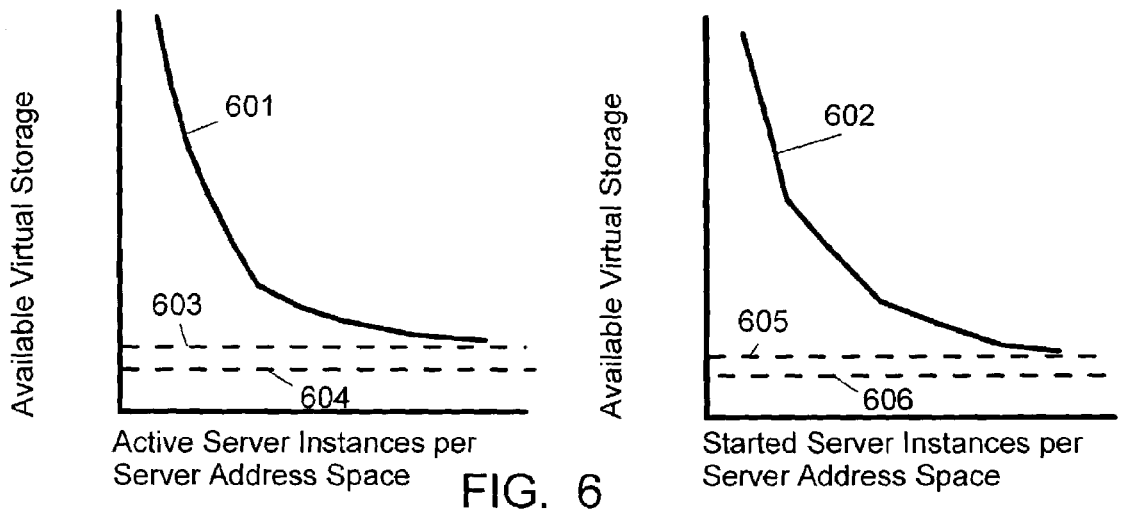
FIG. 6 plots representing the relationship between the available virtual storage and the server instances per address space as used in the embodiment of FIG. 1.
Figure 7:
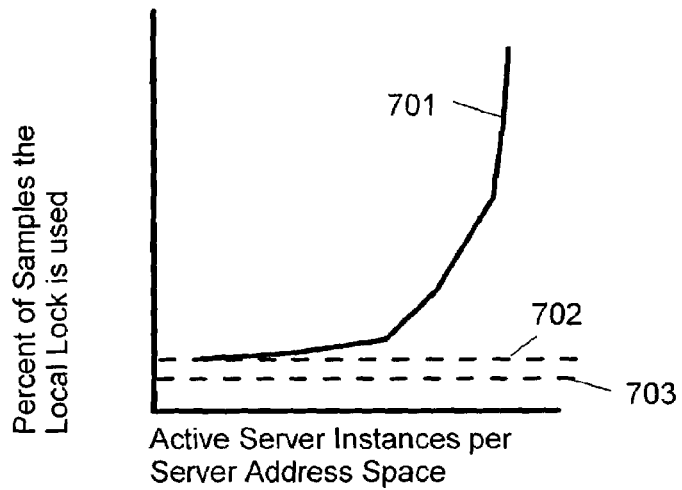
FIG. 7 is a plot representing the relationship between the utilization of the local lock and the server instances per address space as used in the embodiment of FIG. 1.

Server address spaces 133 provide resources for executable server instances 134 similar as the computer system 100 provides resources for the usable address spaces 133. A server address space provides virtual storage that is shared among the programs executed in the address space. In a computer system virtual storage is limited. It depends on the number of bits available in the operating system to address storage and it is limited in order to keep address tables small. Other resources, like common data structures, are locked before the programs update them. The proposed mechanism measures the virtual storage consumption and the utilization of the address space lock to assess the resource consumption of the server address space 133. The data is sampled by component 141 (FIG. 1) and plotted on three plots as shown in FIGS. 6 and 7. The mechanism learns about the actual resource consumption by component 142 through adding more data to the plots over time.

FIG. 6 shows two plots 601, 602 for tracking virtual storage consumption used by the embodiment of FIG. 1. These plots provide accounting of the allocation of storage to the application programs at execution time. Both plots 601, 602 show the available virtual storage as the ordinate (y) value. The plot 601 relates to the currently active server instances 134 as indicated by the abscissa (x) value. The plot 602 relates to the number of started server instances 134 as indicated by the abscissa (x) value. The abscissas of both plots 601, 602 are related to the server instances per server address space 133 but the plots represent in fact the mean values of all sample data generated for all server address spaces 133 of a transaction environment 112. The plots 601, 602 are stored in the resource consumption evaluation component 142 and from there selectively read for being used as subsequently described. Associated with each of the plots 601, 602 are predetermined threshold values 603-606.

In step 531 (FIG. 5) the plots 601, 602 are compared and the plot with the steeper slope is selected for the following assessment. To determine the present virtual storage utilization, step 532 reads the ordinate value for the number of server instances according to the selected virtual storage plot. This value is used as one of the parameters in step 534 to determine the action to be taken.

The active server instances 134 are sampled for local lock utilization. FIG. 6 illustrates a lock usage graph 701 the data of which is stored in the component 142. The ordinate (y) of this graph shows the percentage of samples which found the local lock function being used by the sampled server instance 134 during the sampling interval, while the abscissa (x) shows the average number of active server instances during the sampling period. Graph 701 is associated with threshold values 702, 702. By step 533 the lock utilization data of graph 601 is read to perform the check by a step 534. In this step the virtual storage utilization of the selected plot 601 or 602 and the local lock data for the active server instances are compared against threshold values 603-606 and 702, 703. The threshold values 603, 605 and 703 identify points beyond which (above which for points 603 and 605 and below which for point 703) the number of server instances 134 is increased, while the threshold values 604, 606 and 702 identify points beyond which (below which for points 604 and 606 and above which for point 702) the number of server instances 134 is decreased. The area between the two threshold values of each of the plots 601, 602 and 601 indicates that no action is taken. Thus, if step 534 indicates that the threshold value 604, 606 or 702 for any plot 601, 602 or 701 has been crossed, the number of server instances 134 is decreased. Otherwise, if step 534 indicates that the plot compared is beyond threshold value 603, 605 or 703, a calculation is made to add more server instances. The calculation extends to the data of all server address spaces 133 of a transaction environment 112. When all server instances 134 execute work requests which are classified to the same service class, it may be assumed that the behavior of these server instances 134 is similar.

If it is appropriate to reduce the number of server instances, the mechanism attempts to find a smaller number of server instances which satisfy the check made in step 534. By step 535 the number of server instances is stepwise reduced by one starting at the currently started number of server instances. In each step data for the projected number of server instances is obtained from the plots 601 or 602, and a check similar to step 534 is made to find out whether the projected number of server instances meets the defined resource requirements. The mechanism stops when the check indicates that projected number of server instances meets the resource requirements or when the number of projected server instances is 50% of the started number of server instances. By the latter limit the system is protected against very disruptive changes.

In the case that step 534 indicates that the available virtual storage is above the threshold value 603 or 605, or the local lock utilization below the threshold value 703, a higher number of server instances 134 than currently started may be determined. Step 536 checks the employment status of the server address spaces 133. This test should ensure that enough server instances 134 per server address space 133 are active to base the decision on stable sampled data. Step 536 may determine whether at least 80% of the server instances 134 of one server address space 133 are active. If this true, step 537 performs a check whether a maximum limit of server instances 134 for the application environment 111 has been defined. If this is not the case, there are no limitations for increasing the number of server instances by step 571. If step 536 indicates that the employment status of the server address spaces 133 is lower than, for example, 80% no action is taken as indicated at 538.

At step 571, a calculation is made to stepwise increase the number of server instances 134 per server address space 133 by one. The calculation uses the data from the stored plots 601, 602 and makes sure that the resource consumption of the projected number of server instances does not violate the rules of check of step 534 with regard to the stored threshold values. If there is no value plotted for a higher number of server instances 134 than the currently started number of server instances, the ordinate is interpolated from the ordinates of the two highest number of server instances as indicated by the abscissa values of the plots for which sample data is available. In the embodiment described herein the number of server instances will not be increased by more than 20% of the currently started number of server instances 134 while the minimum increment is one server instance. If step 537 indicates that there is a maximum limit of server instances defined for the application environment 111 as indicated by the application environment definition 113 (FIG. 2), step 572 calculates the maximum of server instances 134 per server address space 133. Based on the result of this calculation the step 571 is performed to stepwise increase the number of server instances 134 per server address space 133.

Step 537 tests whether a maximum limit for the number of server instances 134 has been defined. If a maximum limit has been defined, this limit applies to all server instances 134 for all transaction environments 112 or work queues 132 of an application environment 111. The difficulty is now to ensure that the mechanism described in FIG. 4 at 461 has enough server address spaces 133 which can potentially be moved between the work queues 132 of the application environment. The following calculation is used to determine an upper boundary for the server instances 134 per server address space 133:

$$srv\_lm = mn\_num\_of\_srv/\max(2, num\_of\_work\_queues)$$

with:
- srv_lm is the limit of server instances 134 which can be started for a server address space 133;
- mn_num_of_srv is the minimum number of server instances, this value is set to the half of the maximum limit if no minimum limit has been defined or the smaller value of the defined minimum and the maximum limit divided by two;
- number_of_work_queues is the number of work queues 132 created for the application environment 111.

The maximum calculation between two work queues 132 and the real number of work queues 132 for the application environment 111 is performed to ensure less disruptive adjustments in case the maximum number of server instances 134 is already started. If the maximum number of server 134 is already started, it is necessary to stop server instances 134 for the started server address spaces 133 and to start new server address spaces 133 so that enough server address spaces are available to perform step 461 in FIG. 4. This change is disruptive to the number of available server instances 134 executing work requests because the number of work queues 132 is not predetermined and the excess number of server instances 134 must be stopped first before additional server address spaces 133 are started. This condition is necessary to ensure that for the application environment 111 the maximum number of server instances 134 is not exceeded.

While the invention is disclosed with reference to the described embodiment, modifications or other implementations of the invention are within the scope of the invention as defined in the claims.

What is claimed is:

1. A method for controlling the number of server instances in a computer system controlled by an operating system having server regions that are managed by a workload manager to provide resources for achieving service goals of work units received from application programs, said server regions including a number of server containers each containing a plurality of server instances operating in parallel to execute said work units received from said application programs, comprising the steps of:
    (a) sampling the server instances in a server container at execution time to obtain sample data representing resource usage of server instances that are active during a predetermined sampling interval, said sample data indicating resource contention among said server instances;
    (b) evaluating the sample data to determine a current resource consumption of the computer system in executing the work units;
    (c) (1) calculating an optimal number of server instances per server container from the current resource consumption of the computer system to execute the work units, said step comprising providing threshold values for current resource consumption and using said threshold values to permit or prevent an adjustment of the number of server instances in at least one of the server container, said step comprising restricting the number of server instances in each server container on the basis of restrictions on the total number of server instances permitted for all server containers executing work units for one or more server classes;
    (2) calculating an optimal total number of server instances, executing in parallel in each of the server containers, to execute the work units;
    (3) calculating a number of server containers from the optimal total number of server instances and from the optimal number of server instances per server container; and
    (d) providing feedback to the workload manager based upon the calculated number of server containers and the calculated number of server instances per server container, thereby to cause said workload manager to adjust the number of server containers and the number of server instances in at least one server container; and
    (e) repeating steps (a) to (d) at predetermined time intervals during execution of the work units.

2. The method of claim 1 in which the work units received from the application programs are assigned to service classes according to performance goals defined by the application programs, where at least some of the service classes have a hierarchical relationship to one another.

3. The method of claim 2 in which the work units of each service class are arranged in a work queue and one or more of said work queues contain the work units of one application program and are associated with one server container.

4. The method of claim 3 in which the number of server instances per server container for executing the work units is managed on the basis of both the service classes of the queued work units and the service classes of competing work in the computer system.

5. The method of claim 2 in which step (d) comprises the step of providing feedback to the workload manager for a server container of an upper level, and further comprises the step of adjusting the number of server containers based on the number of active server instances in each of the server containers.

6. The method of claim 1 in which the sample data represents the number of server instances that are active during a predetermined sampling interval.

7. The method of claim 1 in which step (b) comprises the step of determining available virtual storage space on the basis of the number of active server instances per server container.

8. The method of claim 1 in which step (b) comprises the step of determining available virtual storage space on the basis of the number of started server instances per server container.

9. The method of claim 1 in which step (b) comprises the step of determining local lock usage on the basis of the number of active server instances per server container.

10. A computer program product for controlling the number of server instances in a computer system controlled by an operating system having server regions that are managed by a workload manager to provide resources for achieving service goals of work units received from application programs, said server regions including a number of server containers each containing a plurality of server instances operating in parallel to execute said work units received from said application programs, the computer program product comprising program code means stored on a non-transitory computer readable medium that runs on a computer system to perform the following steps:
 (a) sampling the server instances in a server container at execution time to obtain sample data representing resource usage of server instances that are active during a predetermined sampling interval, said sample data indicating resource contention among said server instances;
 (b) evaluating the sample data to determine a current resource consumption of the computer system in executing the work units;
 (c) (1) calculating an optimal number of server instances per server container from the current resource consumption of the computer system, to execute the work units, said step comprising providing threshold values for current resource consumption and using threshold values to permit or prevent an adjustment of the number of server instances in at least one of the server containers, said step comprising restricting the number of server instances in each server container on the basis of restrictions on the total number of server instances permitted for all server containers executing work units for one or more server classes;
 (2) calculating an optimal total number of server instances, executing in parallel in each of the server containers, to execute the work units;
 (3) calculating a number of server containers from the optimal total number of server instances and from the optimal number of server instances per server container; and
 (d) providing feedback to the workload manager based upon the calculated number of server containers and the calculated number of server instances per server container, thereby to cause said workload manager to adjust the number of server containers and the number of server instances in at least one server; and
 (e) repeating steps (a) to (d) at predetermined time intervals during execution of the work units.

11. Apparatus for controlling the number of server instances in a computer system controlled by an operating system having server regions that are managed by a workload manager to provide resources for achieving service goals of work units received from application programs, said server regions including a number of server containers each containing a plurality of server instances operating in parallel to execute said work units received from said application programs, comprising:
 a hardware processor;
 (a) sampling the server instances in a server container at execution time to obtain sample data representing resource usage of server instances that are active during a predetermined sampling interval, said sample data indicating resource contention among said server instances;
 (b) evaluating the sample data to determine a current resource consumption of the computer system in executing the work units;
 (c) (1) calculating, via the hardware processor an optimal number of server instances per server container from the current resource consumption of the computer system to execute the work units, said step comprising providing threshold values for current resource consumption and using said threshold values to permit or prevent of the number of server instances in at least one of the server containers, said step comprising restricting number of server instances in each server container on the basis of restriction on the total number of server instances permitted for all server containers executing work units for one or more service class;
 (2) calculating an optimal total number of server instances, executing in parallel in each of the server containers, to execute the work units;
 (3) calculating a number of server containers from the optimal total number of server instances and from the optimal number of server instances per server container; and
 (d) providing feedback to the workload manager based upon the calculated number of server containers and the calculated number of server instances per server container, thereby to cause said workload manager to adjust the number of server containers and the number of server instances in at least one server; and
 (e) repeating steps (a) to (d) at predetermined time intervals during execution of the work units.

* * * * *